United States Patent Office 3,061,629
Patented Oct. 30, 1962

3,061,629
DIALKYL SULFOXIDE IN PREPARATION OF ISOCYANATE-POLYOL ADDUCT
John W. Wyart, Maplewood, and Joseph A. Vona, Westfield, N.J., and Richard R. Cunningham, Yardley, Pa., assignors to Celanese Corporation of America, New York, N.Y., a corporation of Delaware
No Drawing. Filed Nov. 19, 1958, Ser. No. 774,826
7 Claims. (Cl. 260—471)

This invention relates to the preparation of polyisocyanate adducts and more particularly to a novel process for preparing such adducts by reactions initiated at temperatures as low as 20° C., that is at ordinary room temperatures, whereby the formation of the adduct may be more conveniently and inexpensively effected and more readily controlled. The invention also relates to novel solutions from which said adducts may be conveniently prepared.

Adducts prepared in accordance with the procedures of the present invention have a recognized utility in crosslinking polyester resins in the preparation of urethane coatings and foams. Polyester urethane coatings are usually prepared by mixing the polyester and a polyol-isocyanate adduct just prior to application. The polyol-isocyanate adducts are generally of either of two types—those reactive at room temperatures and those reactive only at elevated temperatures. The adducts which are reactive at room temperature must be combined with the polyester no more than a few hours before application of the coating.

One class of adducts found to be particularly useful in room temperature curing of polyester resins are reaction products of a polyisocyanate, particularly a diisocyanate, and a polyol having at least three methylol groups on a single quaternary carbon atom.

A number of procedures have been devised for forming such adducts. Heretofore these procedures have been carried out at elevated temperatures, wasteful of heat and difficult to control because of tendency to form both monoadducts and higher adducts.

One recognized procedure involves bringing the polyol and isocyanate together in molten form. To carry out methods based on melting it is necessary to take special precautions and to provide special apparatus and to control the temperature of the system within narrow limits.

Another recognized procedure found suitable for the formation of the desired adducts involves solution of the polyol and the isocyanate at elevated temperatures in a suitable solvent, such as boiling ethyl acetate or butyl acetate.

The present invention relates to the preparation of polyol-isocyanate adducts from solutions at low temperatures than have heretofore been considered possible.

One object of the invention is to provide solutions based on solvents in which the formation of the desired adduct may be initiated in the cold, with consequent savings of fuel and equipment and with greater control of the process.

A more specific object of the invention is the preparation of adducts of trimethylol propane and tolylene diisocyanate in a process initiated in solutions at room temperature.

These and other objects will become apparent in the following specification and claims in which preferred embodiments of the invention are given by way of illustration.

Because of the marked chemical activity of the polyisocyanates it is necessary that solvents introduced into the system be substantially free of water and that the solvents be also inert to the polyisocyanate. A number of solvents possessing a suitable inertness are known, including methyl ethyl ketone, toluene, and ethyl acetate, among others, but as shown in the following table, inert solvents for the isocyanates do not, in general dissolve the polyols to any appreciable extent, at room temperature, but are required to be heated to upwards of 50° C. to take the polyol into solution.

It has been found in accordance with this invention that lower dialkyl sulfoxides, containing no more than 6 carbon atoms, are unique inert solvents for polyisocyanates in that they dissolve polyols at room temperature. Dimethyl sulfoxide is the preferred dialkyl sulfoxide. Other sulfoxides which may be used include methyl ethyl sulfoxide, diethyl sulfoxide, dipropyl sulfoxide, diisopropyl sulfoxide, ethyl propyl sulfoxide, and methyl propyl sulfoxide.

The behavior of typical inert solvents for isocyanates with respect to trifunctional polyols is illustrated in the table below. In each of a series of tubes a weighed amount of trimethylol propane was mixed with three times its weight of a solvent. After a period of about 24 hours at room temperature the tubes were examined to ascertain whether or not partial or complete disappearance of the solid phase had resulted. Another set of tubes was prepared in the same fashion and then heated in a water bath to 50° C. and held for one hour. The results were noted qualitatively to determine solubility, partial solubility and insolubility.

In the tabulated results, the polyol is trimethylol propane but it will be recognized that other polyols having at least three methylol groups on a single quaternary carbon atom, such as trimethylolethane, trimethylolbutane and pentaerythritol, possess similar solubility characteristics.

TABLE I

| Solvent | Solubility | |
|---|---|---|
| | Room Temp. | 50° C. |
| Carbon tetrachloride | I | I |
| Diethyl Ether | I | |
| Methylene Chloride | I | |
| Nitropropane | I | I |
| Toluene | I | I |
| Diethylene Glycol Dimethyl Ether | I | S |
| Ethyl Acetate | I | S |
| Cyclohexane | P | S |
| Dioxane | P | S |
| Methyl Cellosolve Acetate | P | S |
| Methyl Ethyl Ketone | P | S |
| Mesityl Oxide | P | S |
| Dimethyl Sulfoxide | S | S |

I—Insoluble—none in solution.
P—Partly soluble—less than 1 part of trimethylol propane dissolved in each 3 parts of solvent.
S—Soluble—more than 1 part of trimethylolpropane dissolved in 3 parts of solvent.

In the preparation of the desired adducts virtually any polyisocyanate may be used, provided it is free of groups which react with the isocyanate radical. Accordingly, the isocyanates should be free of hydroxyl, carboxyl and amino groups. Aliphatic and aromatic isocyanates may be used, the latter being preferred. Tolylene, phenylene, naphthalene and other aromatic diisocyanates are particularly preferred, 2,4 tolylene diisocyanate being the particularly preferred isocyanate in the polyol-isocyanate adducts prepared by our process.

Among the other specific polyisocyanate compounds which may be used are hexamethylene diisocyanate, 2,6 tolylene diisocyanate, 4,4' diphenyl methane diisocyanate, and cyclohexane diisocyanate. Polymeric isocyanates may also be used, such as polymethylene polyphenyl isocyanate (having 2 to 5 phenyl isocyanate groups). For best results, the polyisocyanate should be one which is soluble in the dialkyl sulfoxide at least to the extent of 30 isocyanate gram equivalents per liter.

It is preferred that the polyisocyanate be used in the reaction mixtures in amounts slightly in excess of stoichiometric. Thus, in the case of a diisocyanate and a trifunctional polyol the mol ratio of the former to the latter should be between about 3.0 to 1 and about 3.9 to 1.

The polyols employed in forming the adducts are selected from polyols having three or more methylol groups attached to a single quaternary carbon atom. As indicated above, trimethylol propane is our most preferred embodiment, but other trifunctional polyols can be used.

The examples which follow describe the preparation of adducts formed by bringing 2,4 tolylene diisocyanate and trimethylol propane together in ratios not substantially different from those implied in the reaction.

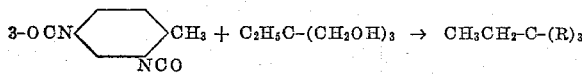

wherein R is

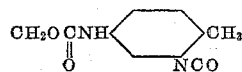

Example I

A clean, dry Erlenmeyer flask was fitted with a foil covered cork and tared. A solution of 15 grams trimethylolpropane and 35 grams ethyl acetate was prepared in a flask by swirling the flask and contents under hot tap water and, after the contents had cooled, adding 5 grams of dimethyl sulfoxide to redissolve the trimethylolpropane which had crystallized out of solution upon standing. The solution was weighed into the tared flask. The reaction flask was placed in a hood and dry nitrogen was passed over the reactants by means of a glass elbow inserted in a two-holed cork on the flask. The flow of nitrogen was regulated so that a very small amount was flowing through the flask at all times, flushing out the air. A weighed charge (60.4 gms.) of 2,4 tolylene diisocyanate was then added to the contents of the flask and the flask was swirled constantly. When the tolylene diisocyanate was added the solution turned cloudy for between 30 and 60 seconds and then turned clear as the reaction began. The reaction proceeded exothermally for 2–3 minutes and the flask became hot. Swirling was continued until the temperature dropped to 40°–50° C. (about ½ hour). Then the flow of nitrogen was discontinued and the clear viscous product was transferred to a corked bottle and stored under an atmosphere of dry nitrogen. The adducts were clear, water white and stable at room temperature when stored under dry nitrogen.

Example II

The procedure of Example I was repeated except that a mol ratio of 3.5:1 was used instead of the mol ratio of 3.1:1 (isocyanate:polyol) used in Example I. The results were comparable.

Example III

The procedures of Examples I and II were repeated except that the dimethylsulfoxide was omitted from the charge, heat being used to dissolve the trimethylolpropane in the ethyl acetate and the reaction being initiated at the elevated temperature. With a mol ratio of 3.1:1 the product was very viscous and viscosity increased overnight to such an extent that in order to keep the adduct from gelling required that it be dissolved in 50% excess ethyl acetate. In comparison, the reaction product of Example I was less viscous and remained liquid for approximately 2 months and gave little evidence of viscosity increase. Furthermore, it was observed that the reaction which took place in the solvent containing dimethyl sulfoxide appeared to proceed more rapidly than the elevated temperature reaction. Similar results were obtained with mol ratios of 3.5:1 as compared with Example II.

Examples IV–VIII

Adducts were prepared in 4-neck 1000 ml. round bottom flasks equipped with condenser, thermometer, agitator and nitrogen inlet. The reaction procedure was essentially that of the preceding examples, that is, the weighed solvents and trimethylol propane were added to the flask and agitated, a flow of nitrogen to flush the flask was begun and then the tolylene diisocyanate was added. The exothermic reaction which occurred raised the temperature to 85°–115° C. Reflux of the ethyl acetate was noted at temperatures above 85° C. with the nitrogen blanketing the reaction mixture. The product was allowed to cool in the flask and then stored in glass jars under dry nitrogen.

Samples of the adducts were placed in 4-oz. bottles under nitrogen to test for shelf life by noting the time to gel. Gardner-Holdt viscosities were determined on the adducts and repeated to note any change in viscosity, considered a good indication of continued polymerization or further reaction among the various functional groups. The table below indicates some of the preparations accomplished.

TABLE II

| Adduct | 4 | 5 | 6 | 7 | 8 |
|---|---|---|---|---|---|
| Trimethylolpropane (g.) | 80 | 80 | 80 | 80 | 80 |
| Ethyl Acetate (99%) (g.) | 180 | 124.3 | 124.3 | 144.3 | 124.3 |
| Dimethyl Sulfoxide (g.) | 20 | 20 | 5.2 | | 30 |
| Tolylene Diisocyanate (g.) | 332.5 | 353.2 | 332.5 | 332.5 | 332.5 |
| Viscosity (Gardner-Holdt) | C | Z5 | X | V | Y |
| Viscosity (overnight) | D | Z6 | | | |
| Viscosity (2 weeks) | D | Z6 | | | |
| TDI:TMP (moles) | 3.2 | 3.4 | 3.2 | 3.2 | 3.2 |

Gardner-Holdt viscosity measurements are made by comparing the time for an air bubble to rise through the test solution in a glass tube with a standard material of known viscosity. Viscosity is rated from A (lowest) to Z6 (highest).

In preparing adduct 5 the trimethylolpropane, dimethyl sulfoxide and ethyl acetate were added initially to the flask and agitated at room temperature to allow some of the trimethylol propane to dissolve. The diisocyanate was then added and the reaction proceeded as it had previously, to a maximum temperature of 113° C. The product was colorless and had a viscosity of Z5 much more viscous than the viscosity of the adduct prepared in the preceding experiment. The viscosity rose to Z6 overnight but did not go much higher subsequently. This method differed in that the trimethylolpropane was not completely dissolved before the addition of the tolylene diisocyanate.

In preparing adduct 6, the trimethylolpropane, tolylene diisocyanate and ethyl acetate were added to the flask and agitated. The dimethyl sulfoxide was added incrementally until the temperature showed a marked rise. Addition of dimethyl sulfoxide was stopped at 35° C., the reaction temperature rose to 85° C. maximum.

Adduct 7 prepared for comparison was produced by heating the ethyl acetate and trimethylol propane in the reaction flask until the trimethylolpropane began to dissolve (53° C.) and then adding the diisocyanate.

Adduct 8 was prepared in the same manner as adduct 5 except that the mol ratio of 3.2:1 was used instead of 3.4:1. The product was clear, water white with a viscosity of Y.

Satisfactory coating compositions were prepared in conventional formulations in which the adducts produced as above described were essential constituents.

It will be seen that dimethyl sulfoxide may be employed as the solvent for the polyol and isocyanate, and that mixtures of solvents in which the dialkyl sulfoxide forms a small proportion of the mixture (only 4% in Example IV) may be employed as the solvent, the remainder of the mixture being selected from other solvents inert to the diisocyanate and compatible with the dialkyl sulfoxide. Ethyl acetate is a suitable material for admixture with the dialkyl sulfoxide because it is commonly included in coating formulation and need not be separated from the adduct. The ratio of dialkyl sulfoxide to other solvent in the solvent mixture will vary with the nature of the other solvent and with the total amount of solvent used. The minimum amount for a particular mixture of a polyol and other solvent may be easily ascertained by adding the dialkyl sulfoxide slowly to the mixture at room temperature until the solid phase polyol disappears. Generally, at least 4% weight percent of dialkyl sulfoxide will be required based on the total weight of solvent.

Instead of ethyl acetate, other liquids may be used in admixture with the dialkyl sulfoxide. For example, other esters such as butyl acetate, propyl acetate and amyl acetate; ketones, such as methyl ethyl ketone, and methyl isobutyl ketone; and other materials, such as carbon tetrachloride, dichloroethyl formal, formamide and dimethyl formamide, etc.

It is to be understood that the foregoing detailed description is merely given by way of illustration and that many variations may be made therein without departing from the spirit of our invention.

Having described our invention what we desire to secure by Letters Patent is:

1. In the process of producing a polyurethane which comprises adducting a polyol containing a quaternary carbon atom with a polyisocyanate, the improvement which comprises carrying out said adducting in an inert organic solvent medium containing at least 4% by weight of at least one dialkyl sulfoxide.

2. The improved process claimed in claim 1 including adducting at about room temperature.

3. The improved process claimed in claim 1 wherein said solvent contains ethyl acetate.

4. The improved process claimed in claim 1 wherein said polyol is trimethylol propane and said dialkyl sulfoxide is dimethyl sulfoxide.

5. The improved process claimed in claim 1 wherein said solvent is dimethyl sulfoxide.

6. The improved process claimed in claim 1 wherein said polyisocyanate is tolylene diisocyanate.

7. The improved process claimed in claim 1 wherein said polyisocyanate and said polyol are present in the initial adducting mixture in a proportion of about 3 to 1 to about 3.9 to 1.

References Cited in the file of this patent

UNITED STATES PATENTS

| | | |
|---|---|---|
| 2,789,129 | Bissinger | Apr. 16, 1957 |
| 2,812,324 | Huber et al. | Nov. 5, 1957 |
| 2,813,867 | Hunter | Nov. 19, 1957 |
| 2,855,421 | Bunge et al. | Oct. 7, 1958 |
| 2,878,279 | Schmid et al. | Mar. 17, 1959 |
| 2,893,990 | Hass et al. | July 7, 1959 |